United States Patent
Rollenhagen

(10) Patent No.: US 9,420,739 B2
(45) Date of Patent: Aug. 23, 2016

(54) MODULAR SEED HOPPER

(71) Applicant: KINZE MANUFACTURING, INC., Williamsburg, IA (US)

(72) Inventor: Trevor N. Rollenhagen, North Liberty, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 178 days.

(21) Appl. No.: 14/176,198

(22) Filed: Feb. 10, 2014

(65) Prior Publication Data

US 2014/0224843 A1 Aug. 14, 2014

Related U.S. Application Data

(60) Provisional application No. 61/763,687, filed on Feb. 12, 2013.

(51) Int. Cl.
*A01C 7/20* (2006.01)
*A01C 15/00* (2006.01)

(52) U.S. Cl.
CPC ............. *A01C 7/20* (2013.01); *A01C 15/006* (2013.01)

(58) Field of Classification Search
CPC .......... A01C 7/20; A01C 7/00; A01C 15/006; A01C 15/005; A01C 15/00
See application file for complete search history.

(56) References Cited

U.S. PATENT DOCUMENTS

| | | |
|---|---|---|
| 2,738,904 A | 3/1956 | Poynor |
| 6,092,476 A | 7/2000 | Wilson |
| 2005/0028714 A1 | 2/2005 | Hagen et al. |

FOREIGN PATENT DOCUMENTS

| | | |
|---|---|---|
| EP | 0389919 B1 | 10/1990 |
| WO | 2004017713 A1 | 3/2004 |

OTHER PUBLICATIONS

Kinze Manufacturing, Inc., PCT/US2014/016004, Notification of Transmittal of the International Search Report and the Written Opinion of the International Searching Authority, or the Declaration mailed Sep. 16, 2014.

*Primary Examiner* — Christopher J Novosad
(74) *Attorney, Agent, or Firm* — McKee, Voorhees & Sease, PLC

(57) ABSTRACT

A modular hopper assembly for use with a seed meter of a row unit for an agricultural planter is provided. The modular hopper assembly includes a base hopper unit that can be attached to the row unit. The base hopper unit can be attached to a seed delivery apparatus, such as an air seed delivery of a central hopper. The base hopper unit is also configured to be attachable to various sizes of row hoppers that can quickly and easily attach to the base unit to provide for varying amounts of storage at each of the row units. As the base unit is operatively attachable to a seed meter, the base unit can be used with generally any seed delivery device, including row hoppers, fluid seed deliveries connected to central hoppers, or the like.

20 Claims, 12 Drawing Sheets

MODULAR SEED HOPPER

CROSS-REFERENCE TO RELATED APPLICATIONS

This claims priority under 35 U.S.C. §119 to provisional application Ser. No. 61/763,687, filed Feb. 12, 2013, which is herein incorporated by reference in its entirety.

FIELD OF THE INVENTION

The present invention relates generally to mechanisms used in agricultural planting machines for storing and distributing seed. More particularly, but not exclusively, the invention relates to the storage and distribution of seed at individual row units for distribution to a respective seed meter that can be used with multiple types of seed meters.

BACKGROUND OF THE INVENTION

An agricultural row crop planter is a machine built for evenly distributing seed into the ground. The row crop planter generally includes a horizontal toolbar fixed to a hitch assembly for towing behind a tractor or other vehicle. A plurality of row units are mounted to the toolbar. The row units include ground-working tools for opening and closing a seed furrow, a seed metering system for distributing seed to the seed furrow, and a storage bin for maintaining a seed supply to the seed meter. In different configurations, seed may be stored at individual hoppers on each row unit or it may be maintained in a central hopper and delivered to the row units as needed.

Seed in a row unit's storage hopper is generally supplied to the bin in one of two ways. In the first method, the hopper is periodically filled by the operator with seed from an external seed source, such as seed bags or a seed tender. In the second method, seed is continuously supplied to the row units from a central storage hopper. As the seed supply is depleted at the row unit, seed is pneumatically delivered from the central hopper. Depending on which of these two methods is used, a different hopper will be installed on the planter. In the first method, a larger hopper is desired to maximize the amount of seed that can be stored on the row unit, while in the second method, a smaller hopper is used to maintain a minimal amount of seed at the row unit.

In addition to the various hopper sizes, hopper shapes also differ depending on the type of seed meter selected. Three types of seed meters are commonly used; mechanical brush meters, mechanical finger meters, and air meters. To ensure that the seed meter will fit properly, a different hopper may be manufactured for each type of seed meter, thus adding another variable.

To accommodate the various combinations of hopper size and seed meter shape, a different hopper will need to be designed and manufactured for each arrangement. For example, hoppers being fitted with an air seed meter may need to be manufactured in a small size for pneumatic seed delivery and two large hoppers for manual fill. This requires the manufacture and inventory of a different hopper for each size of hopper offered for each seed meter type. Therefore, the number of hoppers could rise exponentially. If the hoppers are molded, this would require a different tooling for each hopper, which increases the costs associated with the production and storage of the hoppers greatly.

Thus, there is a need in the art for a more universal-type hopper that allows a variety of hopper volumes to be adapted to a variety of supply systems and seed meters without having to manufacture a unique hopper for each combination. The hopper may be modular, in that it can include a unit that allows for the attachment of various types of seed delivery mechanisms.

SUMMARY OF THE INVENTION

Thus, it is principal object, feature, and/or advantage of the present invention to provide an apparatus that overcomes the deficiencies in the art.

It is therefore an object, feature, and/or benefit of the present invention to provide a modular seed hopper system that allows an assortment of supply sources to be attached to a standard base hopper, thus allowing the same base hopper to be fitted for both continuous and periodic seed supply.

It is another object, feature, and/or benefit of the present invention to reduce the tooling and inventory required for seed hopper manufacturing by eliminating the need to have a unique hopper be produced for each unique combination of seed meter and supply source.

It is still another object, feature, and/or advantage of the present invention to reduce the number of molds required for forming hoppers.

It is a further object, feature, and/or advantage of the present invention to provide a seed hopper that can be configured to store a number of different volumes of seed.

These and/or other objects, features, and advantages of the present invention will be apparent to those skilled in the art. The present invention is not to be limited to or by these objects, features and advantages. No single embodiment need provide each and every object, feature, or advantage.

An aspect of the present invention allows for a seed hopper to be adapted to various supply sources through the use of a modular hopper unit design. In all variations, a standard base hopper unit is selected based on the type of seed meter to be used, e.g., mechanical brush meter, mechanical finger meter, or air meter. The standard base hopper has a seed inlet, an outlet aperture, and a storage body between the inlet and output. Extending outward from the perimeter of the inlet is a horizontal mounting flange for removably attaching an external supply source.

In an embodiment, the external supply source is a secondary hopper mounted to the top of the base hopper at the inlet end of the hopper unit. The secondary hopper can be substantially rectangular in shape, with vertical upper sidewalls and tapered lower sidewalls. The bottom face of the secondary hopper abuts the upper flange face of the base hopper and can be removably attached with fasteners or other means.

In another embodiment, the external supply source is a flat panel with a supply aperture therein. The flat panel is removably attached to the mounting flange of the base hopper such that the base hopper inlet is substantially enclosed. The supply aperture is in fluid communication with the toolbar central seed supply, which supplies the base hopper with seed.

While the present invention illustrates a base hopper and external supply source that are directly attached to each other, it will be appreciated by one skilled in the art that the external supply source may be attached to the base hopper indirectly through the use of couplers or other intermediate adapters.

Figure 1A:
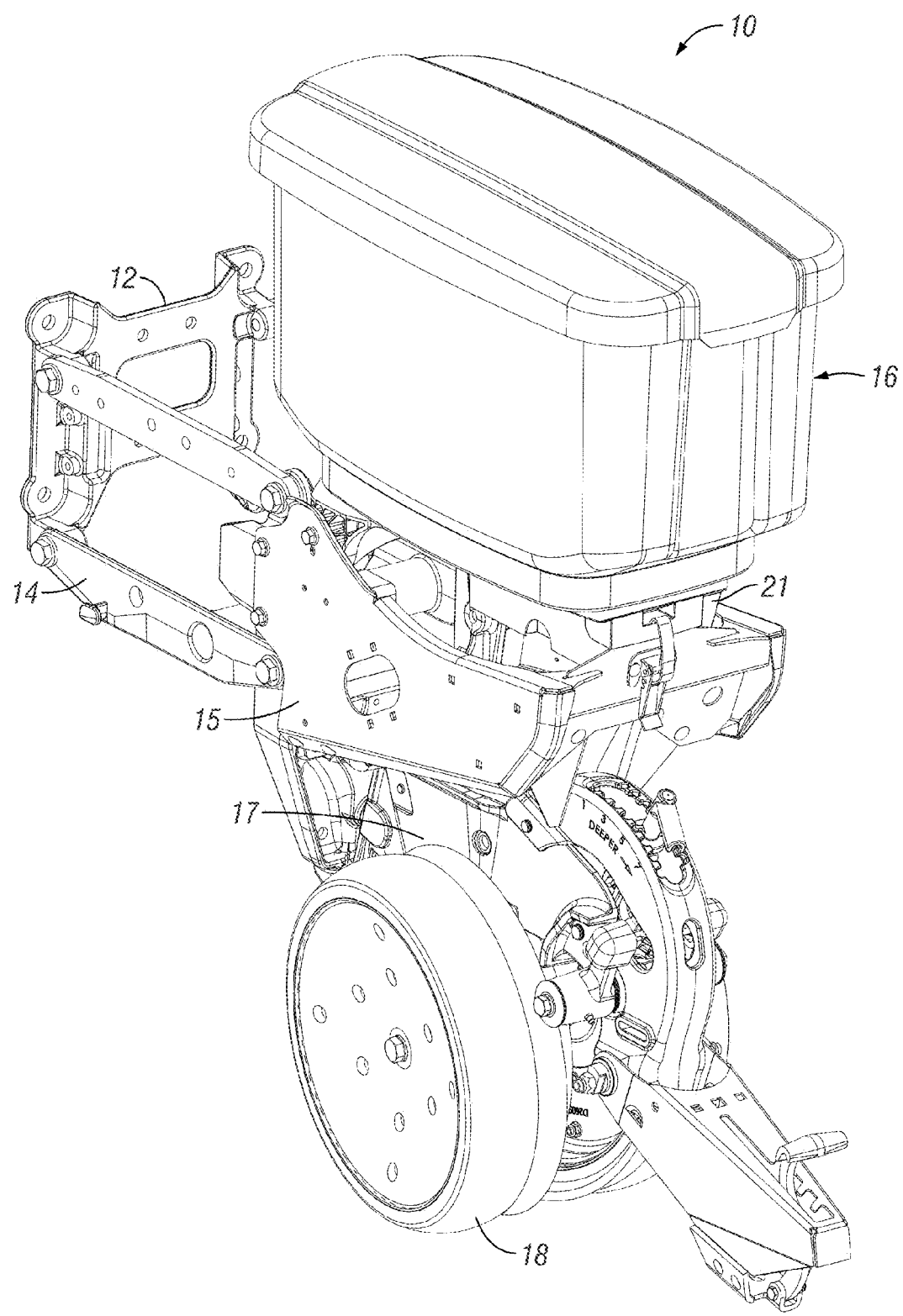
FIGS. 1A and 1B are a perspective and side elevation view of a planter row unit, including the modular seed hopper according to the present invention.
Figure 1B:
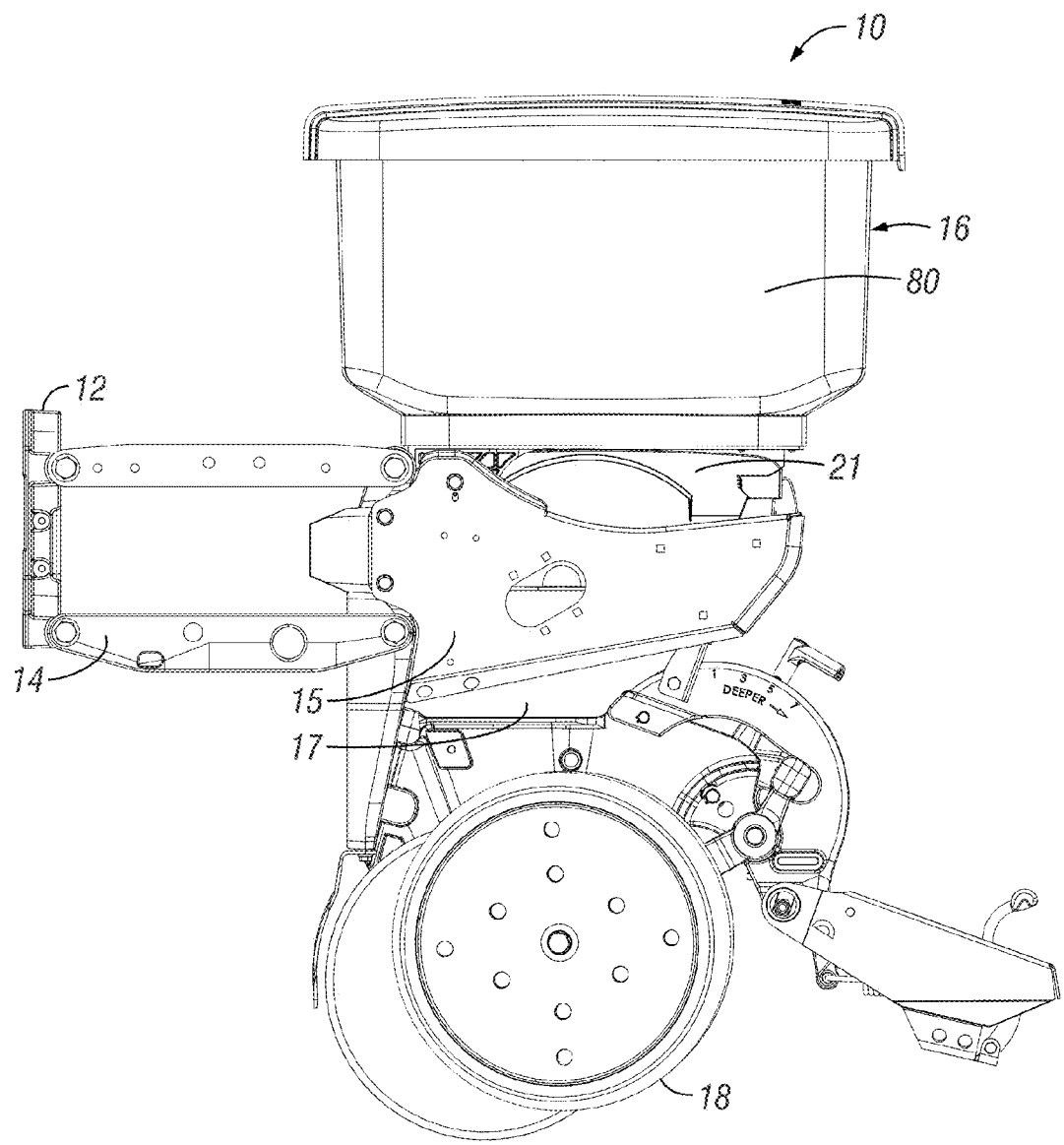
Figure 1C:
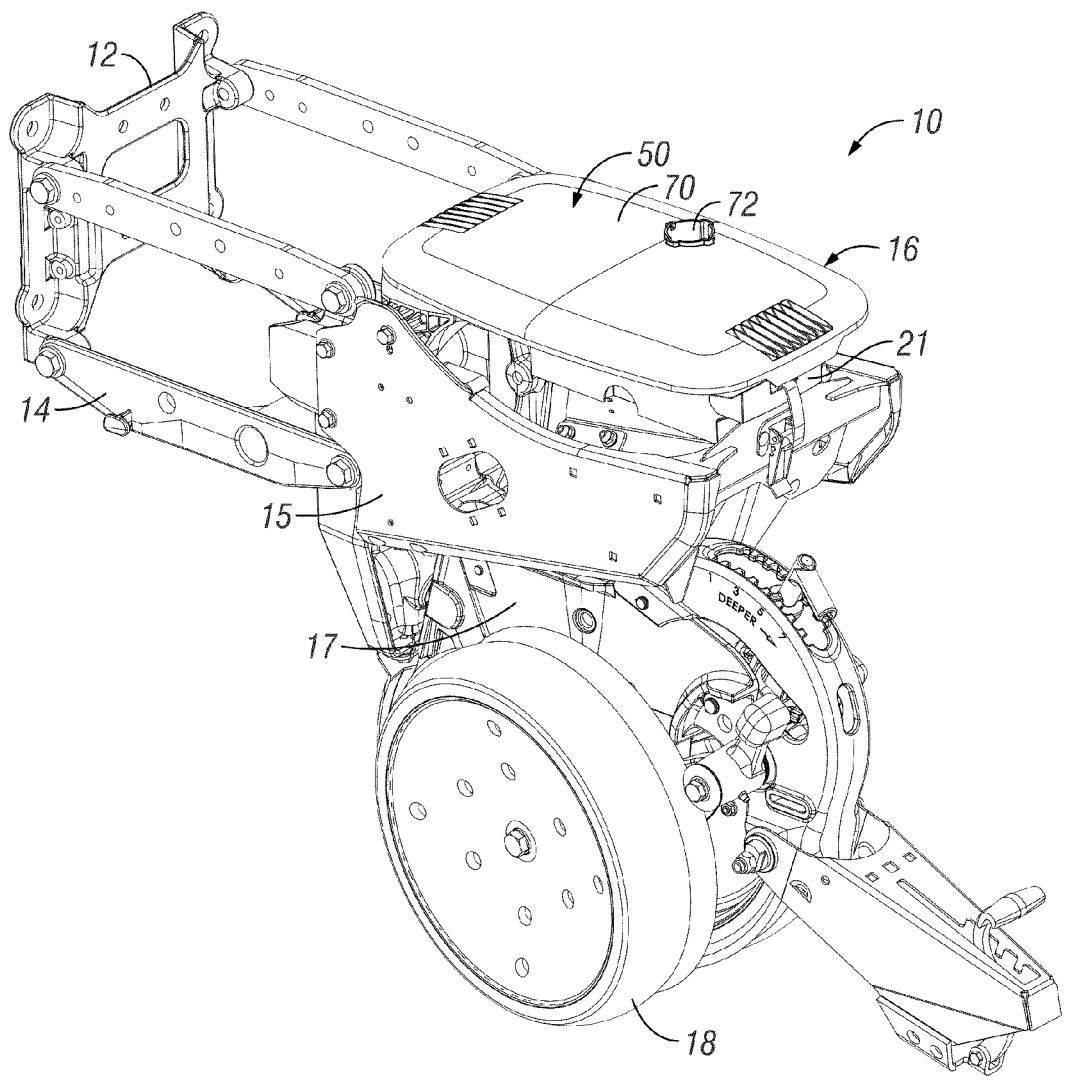
FIGS. 1C and 1D are a perspective and side elevation view of a planter row unit, including another embodiment of a modular seed hopper according to the present invention.
Figure 1D:
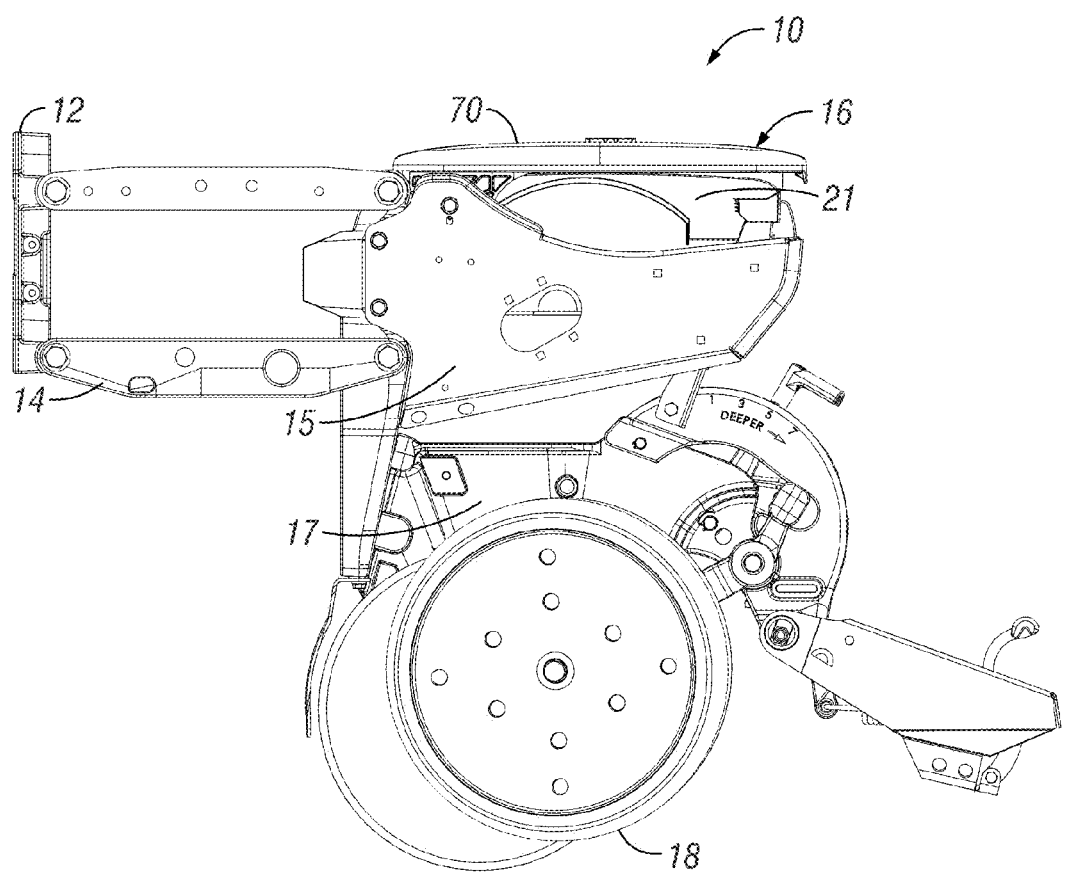
Figure 2:
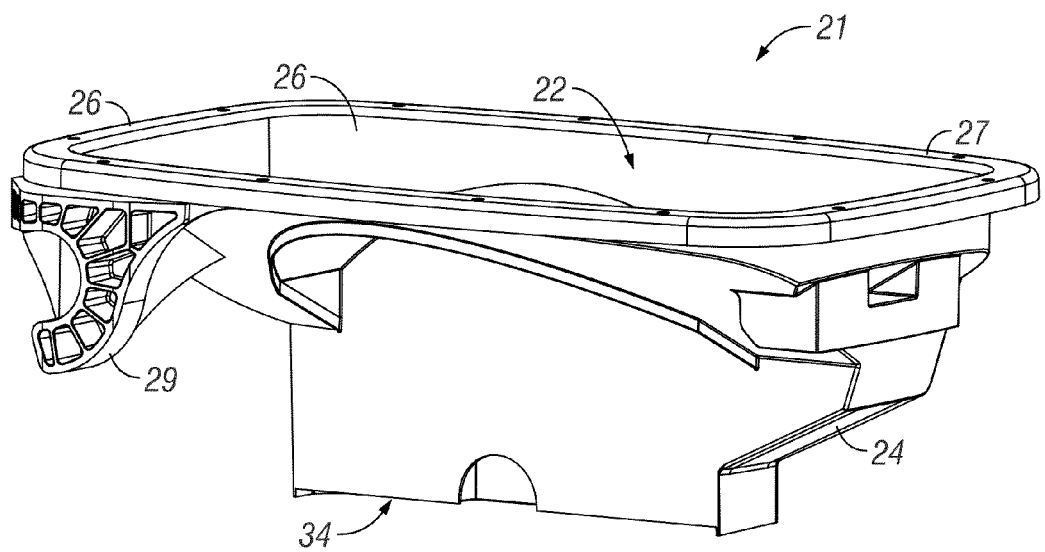
FIGS. 2-5 are perspective, top, and elevation views of an embodiment of the base hopper unit of the present invention.
Figure 3:
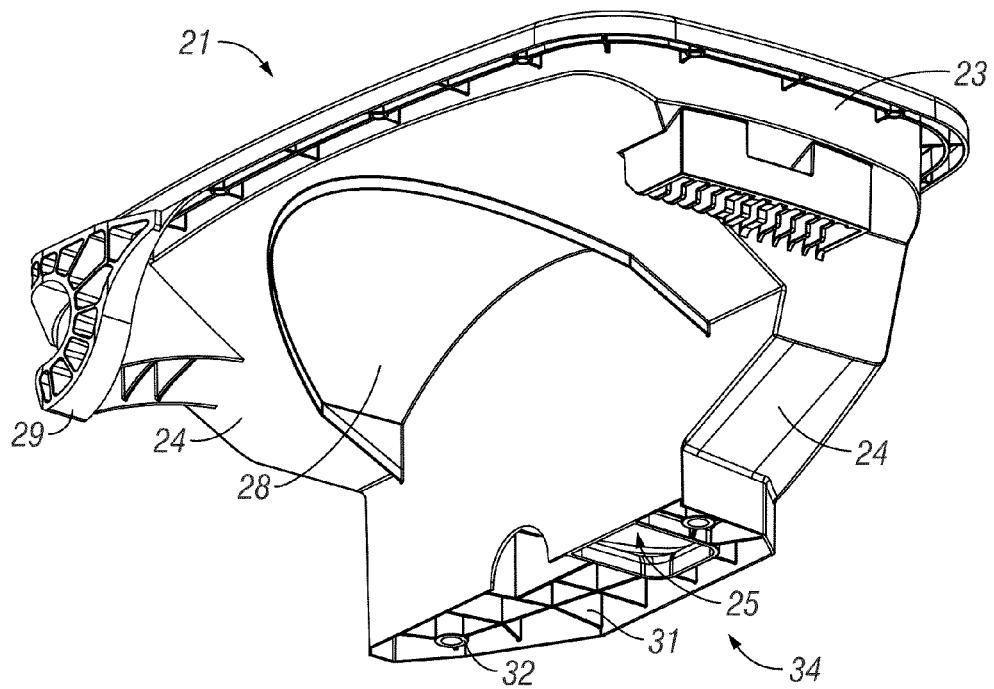
Figure 4:
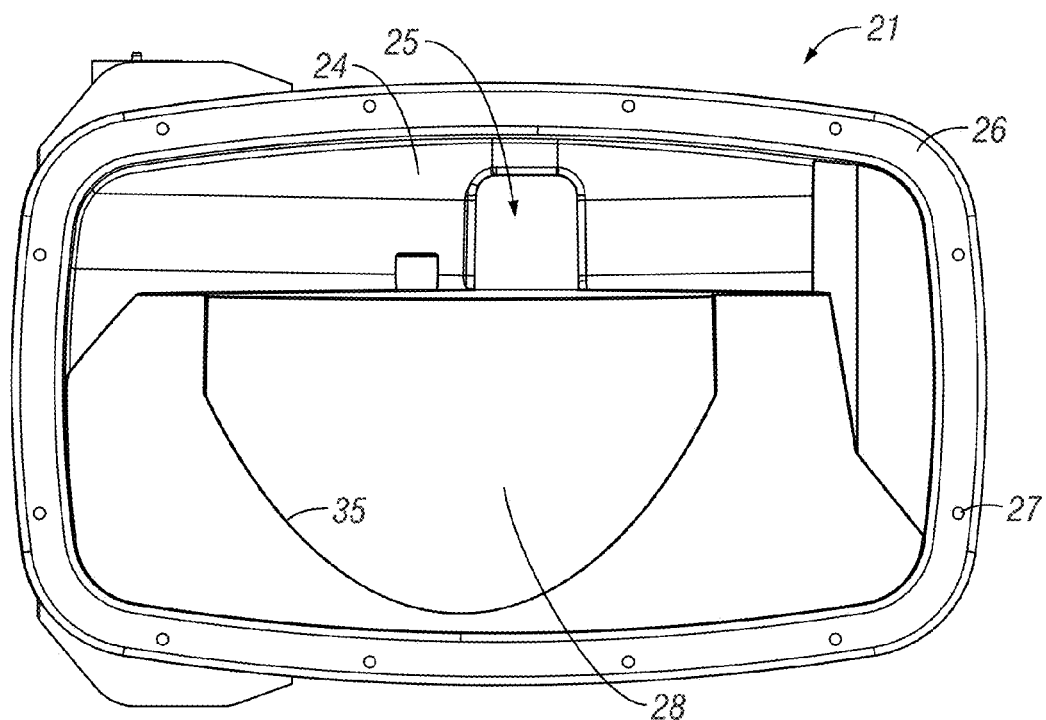

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

Referring to FIGS. 1A-1D, the reference numeral 10 generally designates a planter row unit incorporating the modular seed hopper assembly 16 of the present invention. The row unit 10, aside from the inventive modular seed hopper 16, is known in its general aspects to persons skilled in the art. The row unit 10 includes a U-bolt mount (not shown) for mounting the row unit 10 to a conventional planter frame or tool bar (not shown), as it is sometimes called, which may be a steel tube of 5 by 7 inches (although other sizes are used). The mount includes a faceplate 12, which is used to mount left and right parallel linkages 14, each linkage being a four-bar linkage such as the left one seen in FIGS. 1A-1D. It is noted that the opposite linkage is generally a mirror image of the linkage 14 shown in FIGS. 1A-1D. The double linkage is sometimes described as having upper parallel links and lower parallel links, and the rear ends of all four parallel links are pivotally mounted to the frame 15 of the row unit 10. The frame 15 includes a support for a modular seed hopper 16, as well as a structure including a shank weldment 17 for mounting a pair of ground-engaging wheels 18, and a furrow-closing unit (not shown), which includes a pair of inclined closing wheels. It should be appreciated that the row units 10 shown in FIGS. 1A-1D are for illustrative purposes only, and the present invention contemplates variations made thereto. As will be understood, the modular seed assembly 16 shown in FIGS. 1A-1D includes a base hopper unit and either a lid or an additional storage unit. However, the differences relate generally only to the seed delivery systems, and it is to be appreciated that the modular seed assemblies 16 shown in the Figures can be used with many types and configurations of row units.

The modular seed assembly 16 of the present invention is contemplated to include a variety of seed meters 20, including, but not limited to mechanical seed meters, mechanical finger meters, or air meters. The use of the different seed meters 20 gives end users a choice, while also providing a variety of means for dispensing the seed from the hopper 16 to the ground. The choice of seed meter will be dependent on many factors, including, but not limited to the type and size of seed, ground conditions, planter model, spacing needs, and the like.

Figure 5:
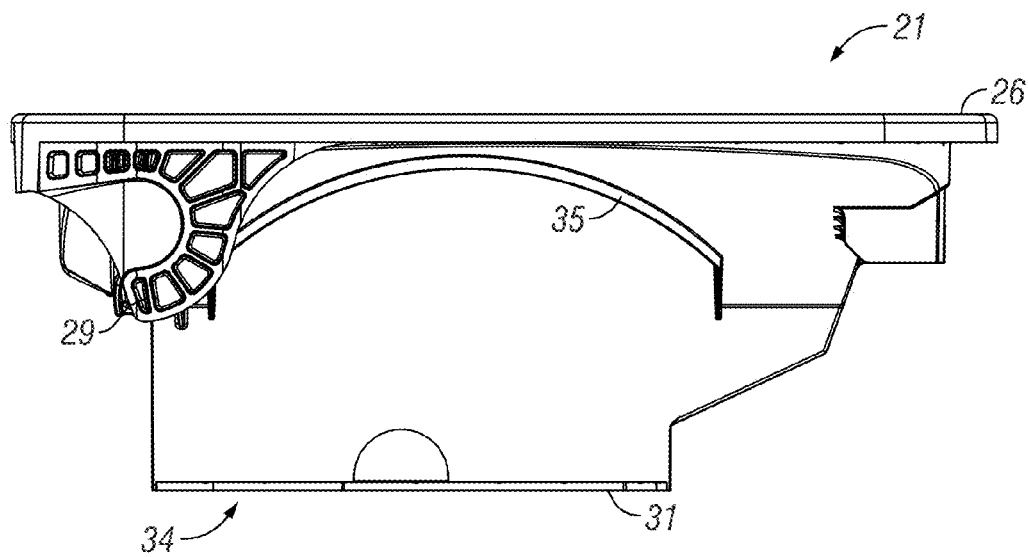
Figure 5A:
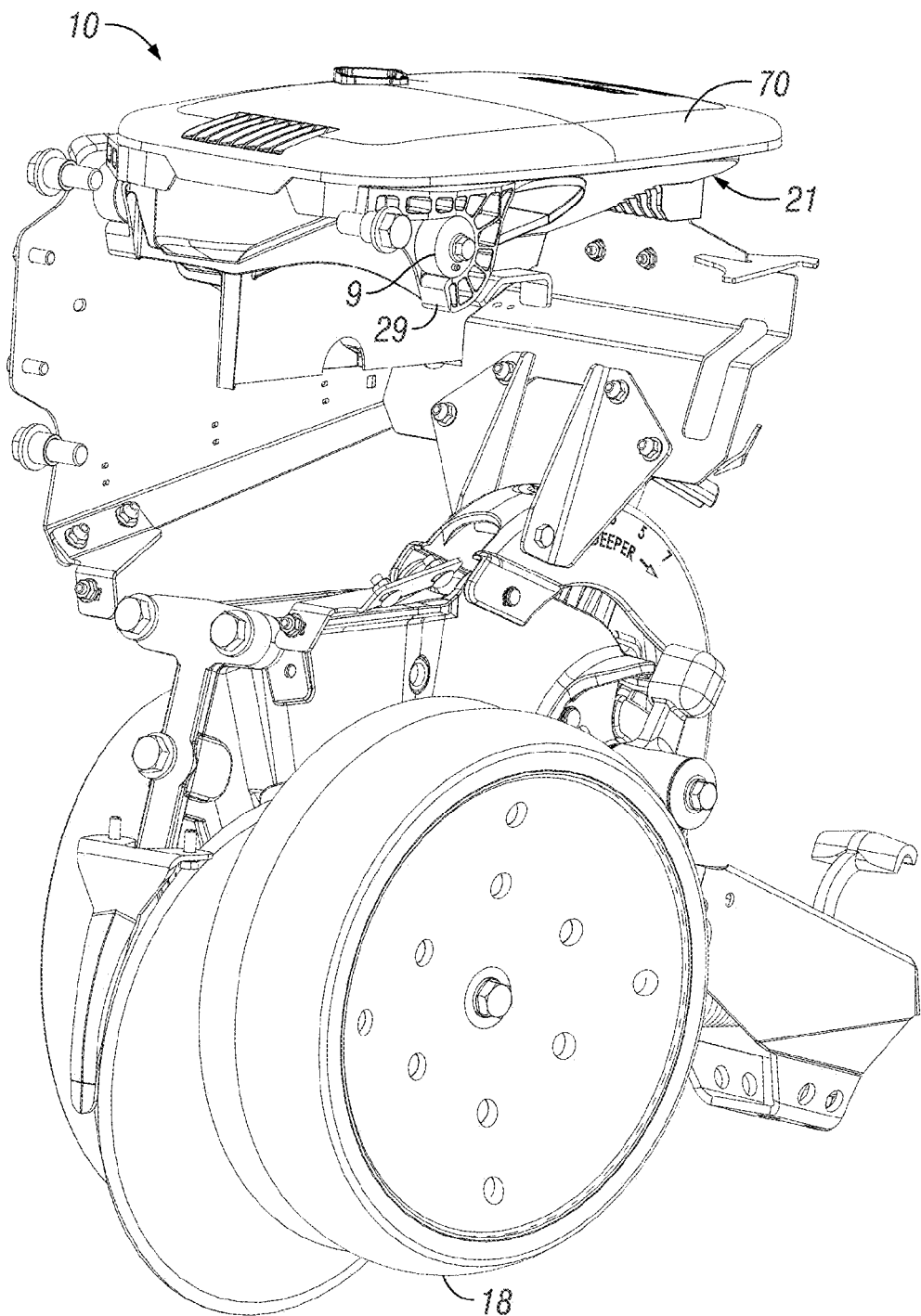
FIG. 5A is a perspective view of a base hopper attached to a row unit.
Figure 5B:
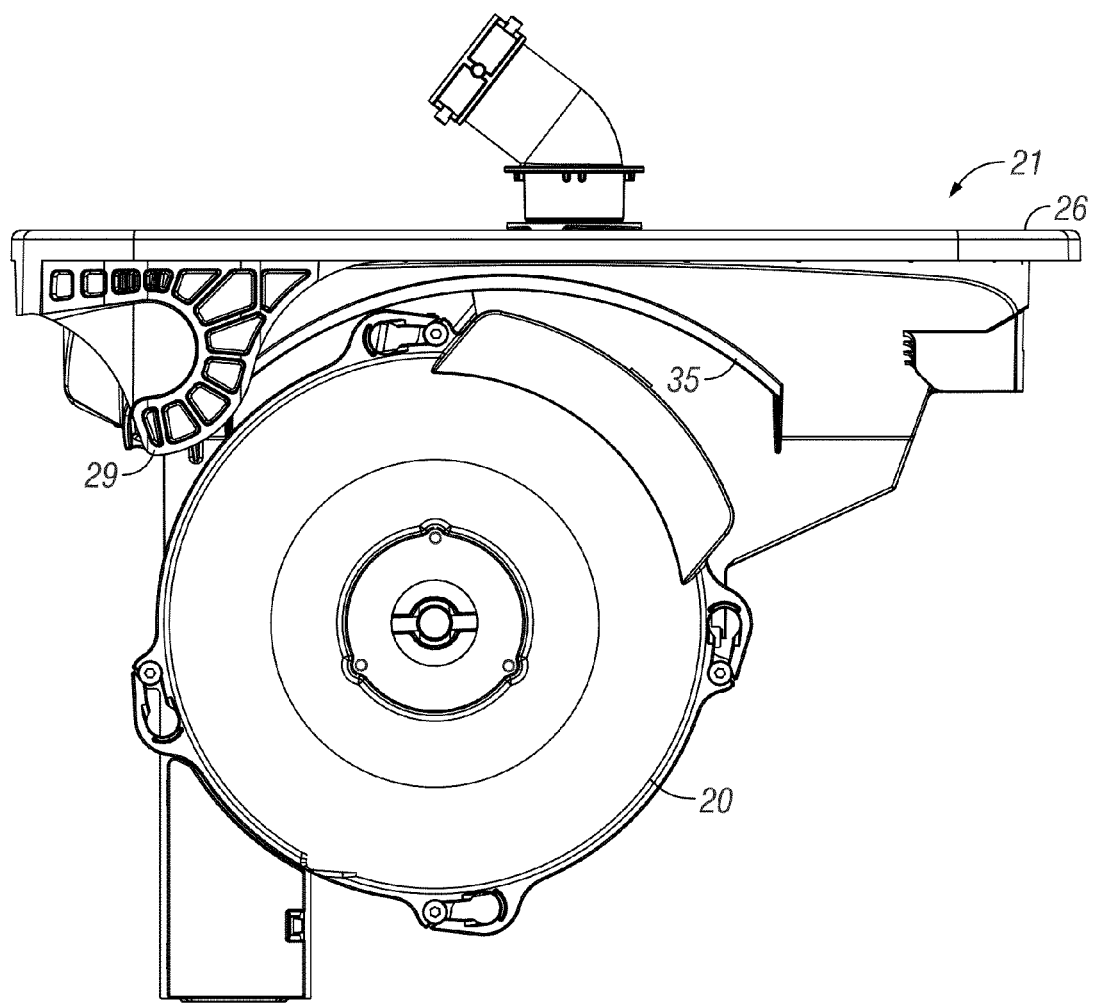
FIG. 5B is a side elevation view of a seed meter attached to a base hopper unit, according to an exemplary embodiment of the invention.

FIGS. 2-5B show an embodiment of the base hopper unit 21 configured for use with a modular seed assembly 16 including mechanical seed meter 20. The base hopper 21 comprises an open-top intermediate storage body 22 formed by upper sidewalls 23 having a substantially rectangular cross section, and lower, tapered sidewalls 24. The lower, tapered sidewalls 24 converge at a discharge outlet 25 at the discharge end 34 of the storage body 22. A mounting face 31 on the bottom of the base hopper 21 surrounds the discharge outlet 25 and includes one or more holes 32, either threaded or unthreaded, used for attaching a seed meter 20 to the base hopper 21. Fasteners, such as screws, pins, dowels, or the like can be inserted into the holes 32 to attach the base hopper 21 to the seed meter 20 and/or row unit 10. The mounting face 31 may be substantially flat or planar, or may be multi-leveled. In addition, the mounting face 31 may include a plurality of ribs 33 to aid in strengthening the base hopper unit 21. At one side of the storage body 22 is an integral pocket 28 for receiving the body of an externally attached seed meter 20. FIG. 5B shows an exemplary embodiment of the base hopper 21 attached to a seed meter 20. The integral pocket 28 is semi-cylindrical with its axis generally horizontally disposed perpendicular to the vertical left sidewall. The pocket 28 may be shaped such that a convex portion 35 of the pocket 28 extends into one or more of the upper and/or lower sidewalls 23, 24.

Figure 6:
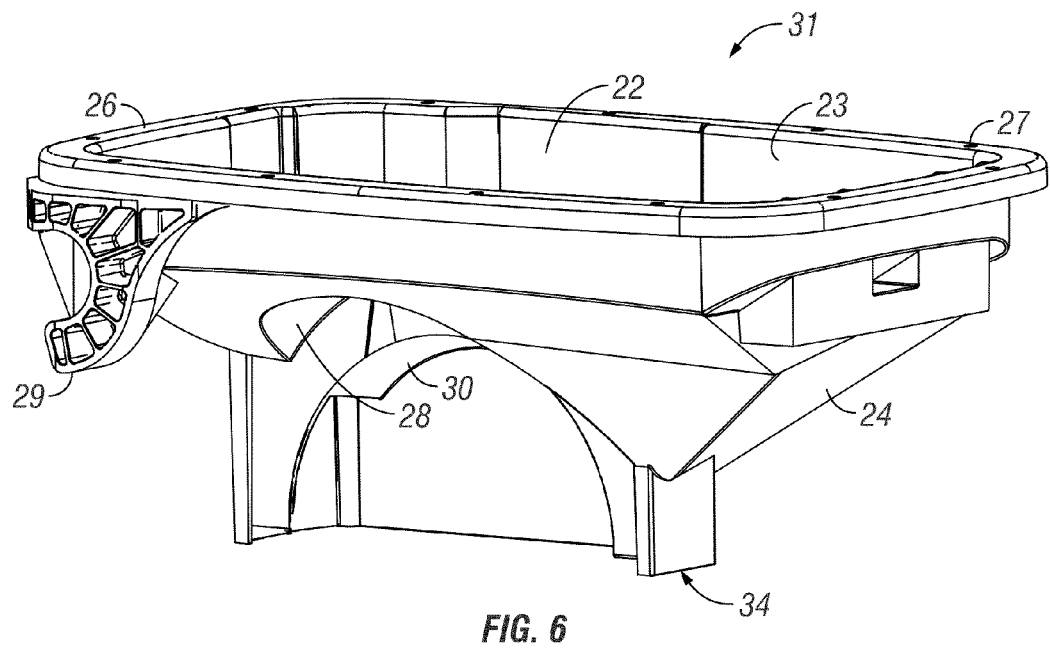
FIG. 6 is a perspective view illustration of another embodiment of the base hopper unit of the present invention.

Extending outward from the perimeter of the upper sidewall 23 is a flange 26 with one or more mounting holes 27 therethrough. Two connection members 29, which are shown as mounting hooks, extend generally downward from the right-front and left-front region of the flange 26. These hooks 29 are used for engaging the base hopper 21 on the row unit 10. For example, the hooks 29 can be configured to engage a member 9 of the frame 15 of the row unit 10 to aid in positioning the base hopper 21 during placement of the hopper and to keep the base hopper 21 in position during planting or other transport. FIG. 5A is a partial sectional view of the row unit 10 showing the hooks 29 engaging members of the frame 15. Note, however, that the hooks could be configured to engage generally any portion of the frame or row unit, and that different row units may include different members for the base hopper 21 to attach thereto. While this is an embodiment of the base hopper 21, one skilled in the art will appreciate that the shape of the hopper can be modified to accommodate various row units and/or seed meters, such as the base hopper 60 shown in FIG. 6. FIG. 6 includes additional cutouts or pockets 30 that may be configured to receive additional portions of seed meters. As shown in FIG. 6, the axis for connecting the seed disc to the base hopper 31 has been moved to accommodate a different disc.

The base hopper unit 21 shown in the Figures comprises high-density polyethylene (HDPE) that is injection molded. As will be discussed, having the base hopper unit 21 as shown and described in relation to FIGS. 2-5B will allow for fewer tools/molds in order to manufacture the seed hopper 16 of the present invention. This is due to the base hopper unit 21 being compatible with multiple sizes and configurations of seed storage sources, which eliminates the need for a separate mold for each combination of seed meter type (mechanical or air) and seed storage type and/or size.

Figure 7:
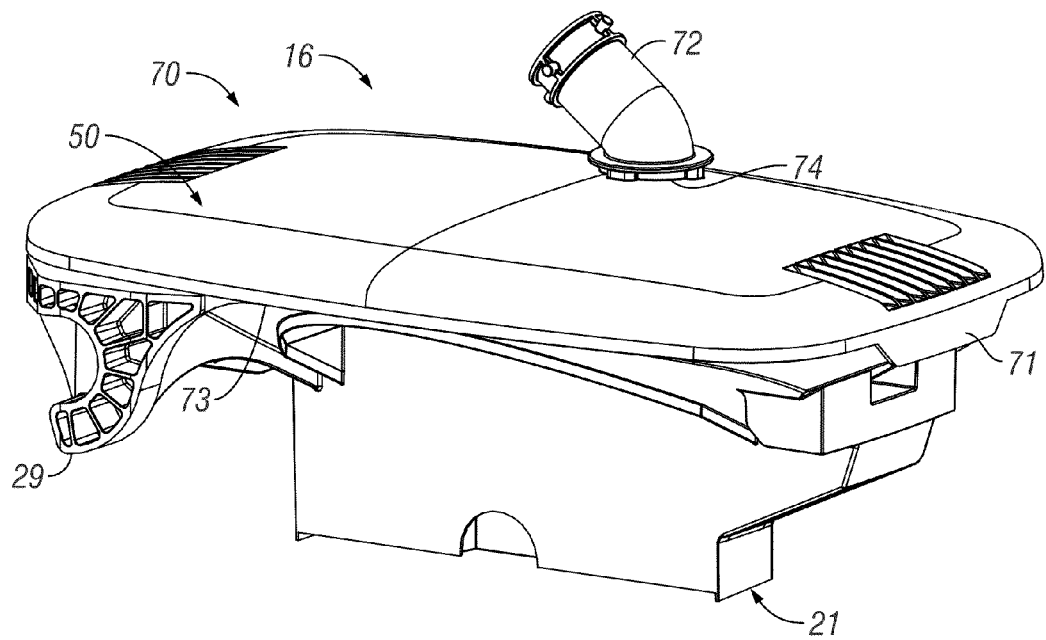
FIG. 7 is a perspective view of an embodiment of invention seed hopper as configured for use in a continuous-supply system.

The modular seed hopper 16 shown in FIG. 7 is configured to operate in a continuous-supply seed storage system by including a supply member 50, which is shown to be a removable cover 70 attached to the flange 26 of the base hopper 21.

For example, the seed hopper 16 shown in FIG. 7 can be attached to an air seed delivery, in which seed is transported from one or more centralized hoppers on the frame of a planter to each of the hoppers of the planter. The cover 70 has substantially the same cross section as the flange 26 of the base hopper 21. The cover 70 includes a lip 73 that surrounds the cover 70 and that fits over the flange 26. The cover 70 is secured to the base hopper 21 via front and rear locking tabs 71 that extend from the lip 73 and engage the underside of the flange 26. An inlet tube 72 is included with the cover inlet 70 such that the inlet tube 72 communicates seed from an external supply source, such as a hose of an air seed delivery mechanism, into the storage body 22 of the base hopper 21. For example, the inlet tube 72 may be formed integrally with the cover 70, or may be inserted into an aperture 74 through the cover 70, and sealed or fixed thereto. Furthermore, the external supply source for this configuration may be a central supply hopper (not shown) on the toolbar of the planter such that the seed is directed from the central supply hopper and into the storage body 22 of the base hopper unit via the inlet tube 72. The inlet tube 72 will be in communication with the supply of seed in the central supply hopper and will receive seed therefrom to pass to the seed meter for dispensement.

Figure 8:
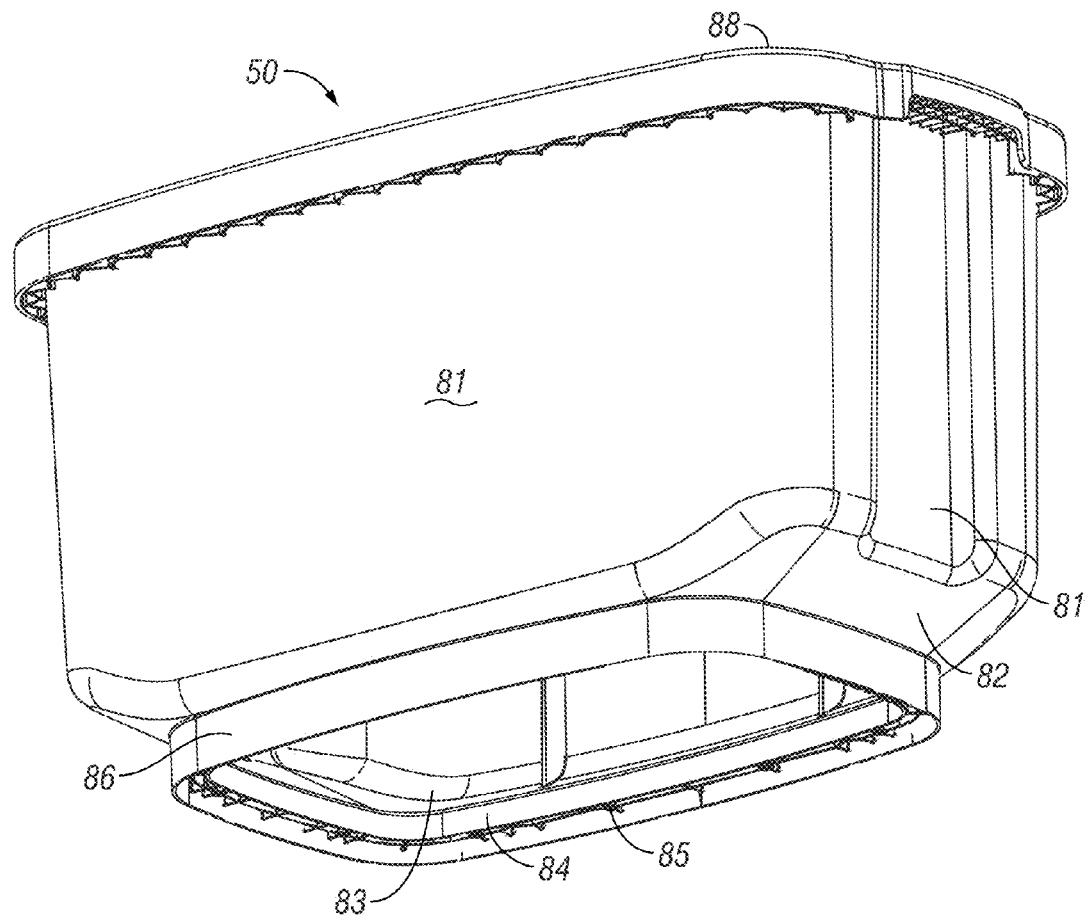
FIG. 8 is a lower perspective view of a secondary hopper to be used as a supply source of the seed hopper of the present invention in conjunction with a period-supply system.

FIG. 8 shows a perspective view of an embodiment of the supply member 50, which is a secondary hopper 80 for use in a manual periodic-supply system in which the operator fills the modular seed hopper 16 using an external seed supply, such as seed bags or a seed tender. The secondary hopper 80 comprises vertical upper sidewalls 81 forming a substantially rectangular cross section and defining an inlet end 88 and a secondary storage body 87, and lower tapered sidewalls 82. The lower tapered sidewalls 82 converge about an outlet 83 at the bottom of the secondary hopper 80. A mounting base 84 borders the outlet 83, having a cross-section substantially similar in shape to that of the flange 26 of the base hopper 21. In operation, the mounting base 84 abuts the flange 26 and is fastened via mounting holes 27 and mounting holes 85. As such, fasteners, such as screws, pins, locks, or the like may be used to connect the mounting base 84 of the secondary hopper 80 to the flange 26 of the base unit 21. An alignment lip 86 extends substantially vertically downward from the outer edge of the mounting base 84 and surrounds the flange 26 to maintain alignment between the corresponding mounting holes. The alignment lip 86 also provided for quick and easy alignment of the secondary hopper 80 to the base unit 21.

While this is one embodiment of a supply source for a periodic-supply system, it will be appreciated by one skilled in the art that a secondary hopper could be constructed in an unlimited combination of shapes and sizes. For example, the size of the secondary hopper 80 can be varied according to seed type, size of field, and other factors related to planting. Furthermore, the size, orientation (including angle), and number of sidewalls 81, 82 can be varied according to seed type, planter make and model, as well as other size constraints related to planting. The Figures show but a few configurations of secondary hoppers 80 that are covered by the present invention.

Figure 9:
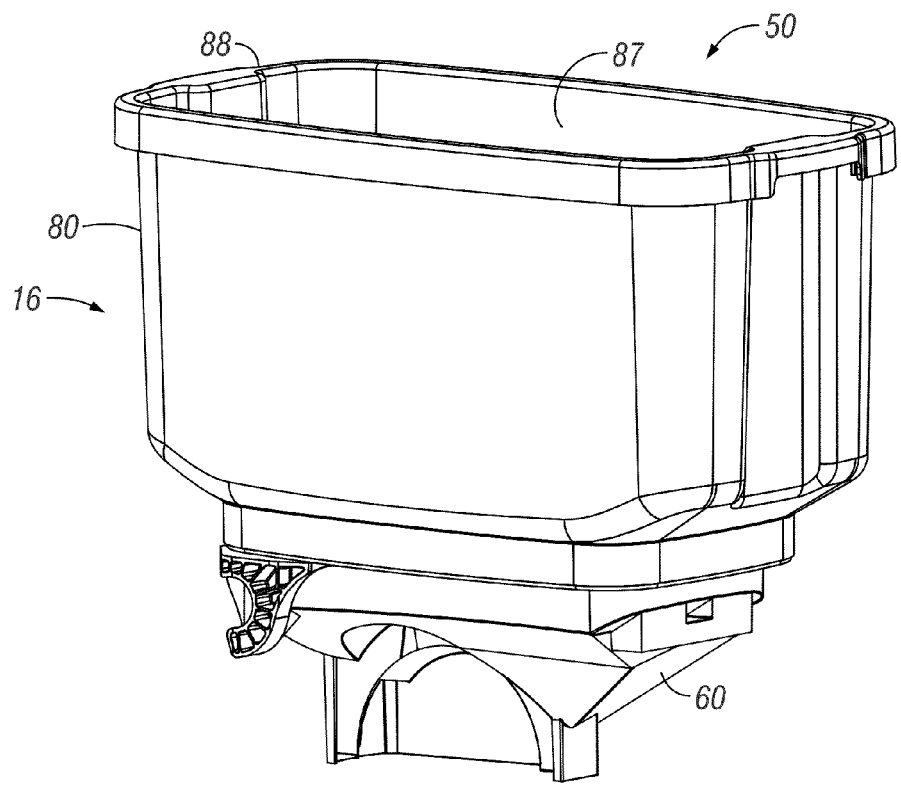
FIGS. 9-12 are views showing various configurations of the modular seed hopper of the present invention configured for use with secondary hoppers as the supply source.
Figure 10:
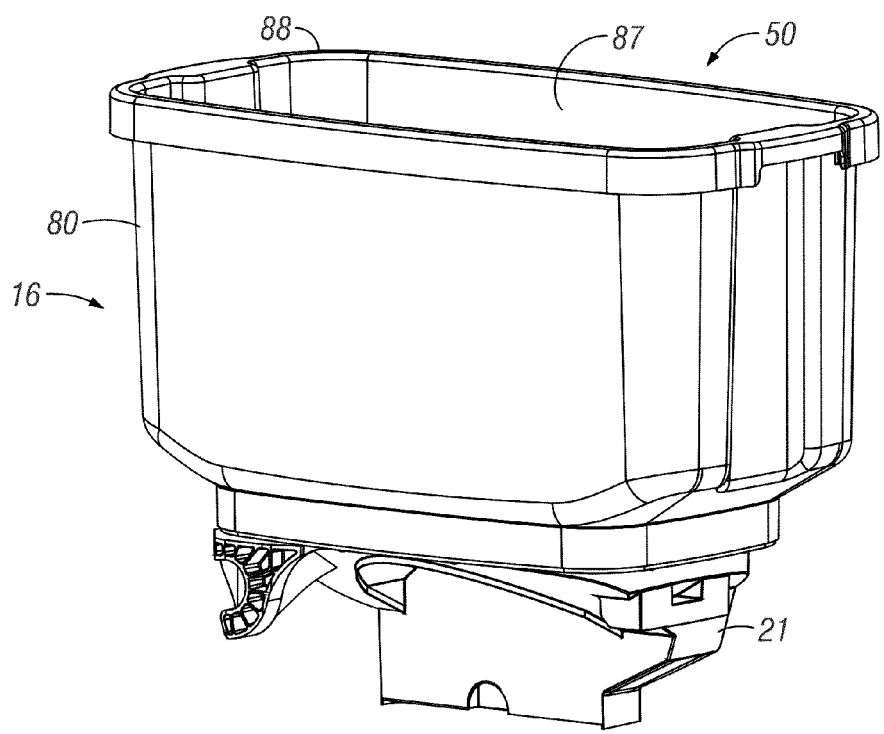
Figure 11:
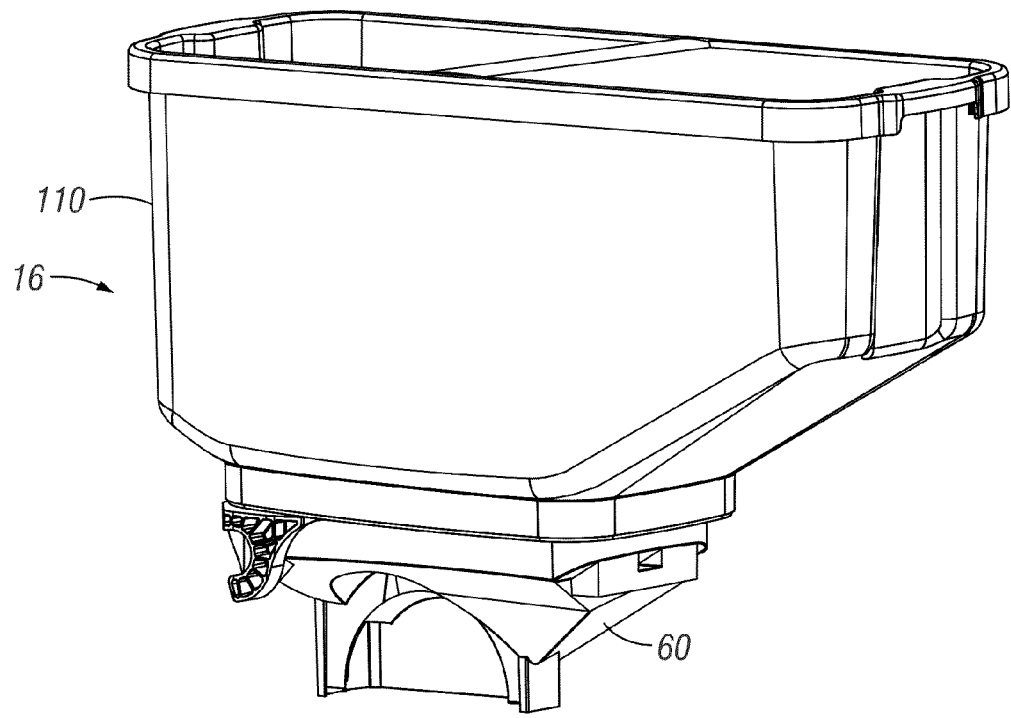
Figure 12:
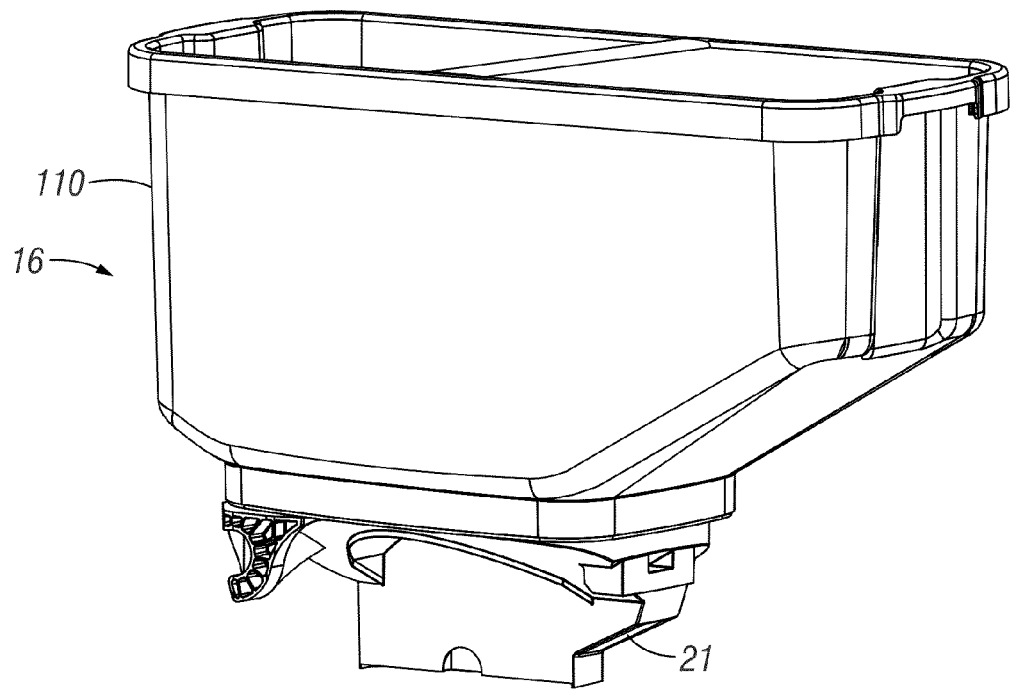

FIGS. 9 and 10 illustrate the combinations of the smaller secondary hopper 80 with the vacuum seed meter base hopper 60 and the mechanical seed meter base hopper 21, respectively. FIGS. 11 and 12 illustrate the combinations of another supply member 50, which is a larger secondary hopper 110 with the vacuum seed meter base hopper 60 and the mechanical seed meter base hopper 21, respectively.

Similar to the base hopper 21, the secondary hoppers 80, 110 can also comprise injected HDPE. Therefore, the present invention provides a main advantage of not having to have a mold or tooling to create each separate configuration for the seed hopper. For example, the following hypothetical provides a planter that is offered with three options for hopper styles/sizes: (1) 1.9 bushel hoppers on each row unit; (2) 3.0 bushel hoppers on each row unit; or (3) mini-hoppers used with either a 40 or 55-bushel central toolbar hopper. Any of the sizes of hoppers can be used with either a mechanical or air seed meter, each with its own interface. Thus, in the past, at least six tools/molds were required to produce the different configurations. All six combinations would also need to be stocked.

According to the embodiments of the present invention, the number or tools/molds can be reduced. One base hopper unit 21 can be provided for a mechanical seed meter 20, and one can be provided for an air seed meter 20. If 1.9 bushel or 3.0 bushel hoppers are required, these base hopper units 21 would be used as the base with a separate upper portion fastened thereto. Either a 1.9 or 3.0 bushel upper hopper can be attached to either of the mechanical or air seed meter base hopper units utilizing a common (modular) interface. This reduces the number of hopper molds from six large, very expensive molds to two large, slightly less expensive molds, and two very less expensive base hopper molds. Furthermore, lids can snap over base hopper units 21 when used with bulk fill.

A modular hopper assembly for use with a seed meter of a row unit for an agricultural planter has thus been described. The present invention contemplates numerous variations, options, and alternatives, and is not to be limited to the specific embodiments described herein. For example, materials used to form the base hopper, lid, and secondary containers may be varied. Sizes and volume capacities of the containers and inlets/outlets may be varied. In addition, the secondary containers may include lids or other coverings to protect any seed stored within. The exact type of connections between the various components may also be varied according to size and availability. For example, pins, locks, screws, snaps, adhesives, buttons, hooks, or the like may be used to connect the various components to one another. The exact form of connection shown and described is not to be limiting to the present invention. Other changes are considered to be part of the present invention.

What is claimed is:

1. A modular hopper assembly for use with a seed meter of a row unit for an agricultural planter, comprising:
    a base hopper unit including an open inlet end, a discharge end, and a storage body therebetween, the discharge end including a discharge aperture therethrough;
    wherein the discharge end is configured to attach to a seed meter; and
    a supply member attached to the inlet end of the base hopper unit and in communication with the discharge end to provide seed to the seed meter;
    said inlet end of the base hopper unit comprising a common interface for attaching to one of a plurality of types of supply members taken from the group consisting of an air seed delivery system, a secondary hopper at the row unit, or a combination of the air seed delivery system and the secondary hopper.

2. The assembly of claim 1 wherein the storage body of the base hopper unit further comprises upper sidewalls extending from the inlet end, and lower tapered sidewalls extending from the upper sidewalls and converging at the discharge end.

3. The assembly of claim 2 wherein the base hopper unit further comprises a flange at the inlet end.

4. The assembly of claim 3 wherein the base hopper unit further comprises first and second connection members extending from the unit and configured to attach to the row unit.

5. The assembly of claim 4 wherein the base hopper unit further comprises a pocket formed in at least one of the sidewalls and configured to house a portion of the seed meter.

6. The assembly of claim 1 wherein the supply member comprises a cover attached to the inlet end of the base hopper unit and including an inlet aperture for transporting seed to the base hopper unit.

7. The assembly of claim 1 wherein the supply member comprises a secondary hopper comprising:
   a. an inlet end;
   b. upper sidewalk extending generally downward from the inlet end and defining a storage body;
   c. an open outlet end opposite the inlet end and substantially similar to the configuration of the inlet end of the base hopper unit; and
   d. lower walls transitioning from the upper walls to the outlet end of the secondary hopper.

8. The assembly of claim 7 wherein the secondary hopper further comprises a lip extending around the outlet end and a flange extending inward from the lip, the lip and flange configured to attach the secondary hopper to the base hopper unit.

9. The assembly of claim 8 wherein the base hopper unit is configured to attach to and support secondary hoppers capable of storing different volumes of seed.

10. A modular hopper for an agricultural planter, comprising:
    a base hopper unit comprising:
       a. an inlet end and a discharge aperture disposed below the upper inlet,
       b. an intermediate storage body between the inlet and discharge defined within vertical upper sidewalls and lower tapered sidewalls, said lower tapered sidewalls converging at the discharge aperture,
       c. a flange extending outwardly from the upper edge of the upper sidewalls and bounding the perimeter of the hopper,
       d. said discharge aperture extending through a protrusion extending from the bottom of the hopper, and
       e. said protrusion having a bottom face configured for removably attaching a seed meter;
    said inlet end of the base hopper unit comprising a common interface for attaching to one of a plurality of types of supply members taken from the group consisting of an air seed delivery system, a secondary hopper at the row unit, or a combination of the air seed delivery system and the secondary hopper.

11. The hopper of claim 10 further comprising connection members extending from the base hopper unit and configured to attach the base hopper unit to a row unit of an agricultural implement.

12. The hopper of claim 11 wherein the connection members comprise hook-like members for receiving a portion of a frame of the row unit.

13. The hopper of claim 12 wherein the hook-like members extend at least partially downward from the flange at a front portion of the base hopper unit.

14. The hopper of claim 10 wherein the base hopper unit further comprises a pocket configured to at least partially house a portion of a seed meter attached to the base hopper unit at the row unit.

15. The hopper of claim 14 wherein the pocket extends at least partially into the intermediate storage body of the base hopper unit.

16. A modular hopper for an agricultural planter, comprising:
    a lower base hopper having an upper inlet and a lower discharge aperture surrounded by a series of upper sidewalls and lower tapered sidewalls, a horizontally disposed mounting flange extending outward from an upper edge of the upper sidewall, and a surface adjacent said discharge aperture and extending generally vertically downward from the bottom of the hopper, said lower base hopper operatively connected to a seed meter;
    an interchangeable supply member removably attached at the upper inlet of the base hopper via said mounting flange such that an outlet of the supply source is in communication with the upper inlet of the base hopper
    said base hopper comprising a common interface for attaching to one of a plurality of types of supply members taken from the group consisting of an air seed delivery system, a secondary hopper at the row unit, or a combination of the air seed delivery system and the secondary hopper.

17. The modular hopper of claim 16, wherein the mounting flange having a plurality of apertures therein, said apertures being substantially evenly spaced about the flange.

18. The hopper of claim 17 wherein said upper sidewalk include a horizontally disposed semi-cylindrical sidewall being oriented such that a convex surface extends into at least one of the upper sidewalls.

19. The modular hopper of claim 18 wherein the supply member comprises a secondary hopper comprising a bottom-mounting base and an upper storage body, said mounting base being substantially similar in shape to the mounting flange of the base hopper and including a plurality of threaded apertures spaced about the mounting base.

20. The modular hopper of claim 18 wherein the supply member is a cover having an aperture therein, said cover removably attached to the base hopper via engagement with said mounting flange.

* * * * *